Patented June 12, 1928.

1,673,493

UNITED STATES PATENT OFFICE.

WILLIAM H. BRADLEY, OF RIPON, CALIFORNIA.

PROCESS OF PREPARING AND PRESERVING CITRUS-FRUIT JUICES.

No Drawing.   Application filed June 1, 1925.   Serial No. 34,186.

This invention relates to improvements in the process of preparing and preserving citrus fruit juices, and is directed specifically to the production of an essence of combined lemon and orange juices.

While a beverage made from these juices is highly palatable and refreshing it has been a hard matter to prepare them for commercial use due to the fact that their acid nature and the pulp therein made them hard to clarify and to prevent fermentation.

I have worked on the problem many years and have at last solved the same, so that now I can prepare the juices and preserve the same for commercial use.

In carrying out my improved process I first press the juices from the oranges and lemons and place same in containers and allow them to stand in a refrigerator at a temperature in any event below the fermenting point and preferably at approximately 35° F.

The juices are thus allowed to stand in the refrigerated temperature for from twelve to twenty hours to allow the pulp to separate from the juices and the clarified juices are then drawn off.

I then mix the lemon and orange juices in equal parts, since the clarified orange juice alone is flat and insipid.

After the two juices are so mixed then to the mixture is added equal parts, by volume, of sugar. The mixed juices with the sugar are then allowed to again stand in the refrigerated temperature for from twelve to twenty hours to cause the juices to thoroughly absorb the sugar.

The reason why I put the sugar into the juices and allow them to stand under refrigerated condition instead of trying to mix the sugar by stirring or heating as previously practiced is that I have found from experiment that when the sugar is mixed with the clarified juices it tends to create a sedimentary condition. If the juices are placed in refrigerated condition until the sugar has been completely absorbed this sediment seems to settle to the bottom so that the pure clarified juices can be withdrawn therefrom. If, on the other hand, the sugar is mixed by the heretofore well known practices of stirring or heating this sedimentary condition seems to remain in suspension throughout the liquid and will not settle for many weeks or months after the juice is bottled, so that the product is discolored and muddy appearing and is entirely unsatisfactory for commercial uses. On the other hand the juices treated by my method will be perfectly clear and will remain so continuously after the juice has been bottled.

The next step in the process is to then place the juices in glass, enamel or like containers and immerse the same in cold water. The cold water is then heated to bring the juices to a boiling heat, at which time they are withdrawn from the containers and bottled and sealed while still at boiling heat.

The product thus attained is a finely clarified and well preserved essence of the juices of the two fruits and by adding water and ice thereto makes a most delicious beverage.

The pulp accumulated from the foregoing process is prepared into a table syrup by putting one part lemon pulp into two parts orange pulp, adding equal parts of sugar and boiling same until it is reduced to a thick syrup.

Having thus described my process, what I claim as new and useful is:

1. The herein described process of preparing and preserving citrus fruit juice consisting in extracting the juice, allowing the extracted juice to stand in a refrigerated temperature for a period of time to allow the pulp to separate from the juice, drawing off the clarified juice, adding sugar to the clarified juice, allowing the juice to again stand in a refrigerated temperature until the sugar is absorbed by the juice, then sterilizing and bottling the juice.

2. The herein described process of preparing and preserving citrus fruit juice consisting in extracting the juice, allowing the extracted juice to stand in a refrigerated temperature for a period of time to allow the pulp to separate from the juice, drawing off the clarified juice, adding sugar to the clarified juice, allowing the juice to again stand in a refrigerated temperature until the sugar is absorbed by the juice, then placing the juice in containers and immersing same in cold water, then heating the water to bring the juice to a boiling heat, then withdrawing and bottling the juice while at said boiling heat.

3. The herein described method of preparing and preserving orange and lemon juice consisting in extracting the juice of each fruit, allowing the extracted juice to stand in a refrigerated temperature for a period of time to allow the pulp to separate from the juice, drawing off the clarified juice, mixing the clarified lemon juice and orange juice together in the proportion of fifty per cent of each by volume, adding sugar to the mixed and clarified juice, allowing the juice to again stand in a refrigerated temperature until the sugar is absorbed by the juice, then sterilizing and bottling the juice.

In testimony whereof I affix my signature.

WILLIAM H. BRADLEY.